(12) United States Patent
Ioffe et al.

(10) Patent No.: US 9,588,990 B1
(45) Date of Patent: *Mar. 7, 2017

(54) PERFORMING IMAGE SIMILARITY OPERATIONS USING SEMANTIC CLASSIFICATION

(71) Applicant: Google Inc., Mountain View, CA (US)

(72) Inventors: Sergey Ioffe, Mountain View, CA (US); Yushi Jing, Mountain View, CA (US); Stephen C. Holiday, Brampton (CA)

(73) Assignee: Google Inc., Mountain View, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 14/678,507

(22) Filed: Apr. 3, 2015

Related U.S. Application Data

(63) Continuation of application No. 13/732,813, filed on Jan. 2, 2013, now Pat. No. 9,025,811.

(51) Int. Cl.
*G06K 9/00* (2006.01)
*G06F 17/30* (2006.01)
*G06K 9/62* (2006.01)

(52) U.S. Cl.
CPC .... *G06F 17/3025* (2013.01); *G06F 17/30256* (2013.01); *G06K 9/6212* (2013.01)

(58) Field of Classification Search
CPC ..... G06K 9/6262; G06K 9/00684; G06K 9/62
See application file for complete search history.

(56) References Cited

U.S. PATENT DOCUMENTS

| 6,556,196 | B1 | 4/2003 | Blanz | |
| 6,826,316 | B2 * | 11/2004 | Luo | G06K 9/52 358/403 |
| 7,095,878 | B1 | 8/2006 | Taylor | |
| 8,406,470 | B2 | 3/2013 | Jones | |
| 8,832,096 | B1 | 9/2014 | Jing | |
| 2008/0133521 | A1 * | 6/2008 | Podilchuk | G06K 9/6857 |

OTHER PUBLICATIONS

Notice of Allowance issued in U.S. Appl. No. 13/732,813 on Jan. 5, 2015, 14 pages.

* cited by examiner

*Primary Examiner* — Shefali Goradia
(74) *Attorney, Agent, or Firm* — Fish & Richardson P.C.

(57) ABSTRACT

Image similarity operations are performed in which a seed image is analyzed, and a set of semantic classifications are determined from analyzing the seed image. The set of semantic classifications can include multiple positive semantic classifications. A distance measure is determined that is specific to the set of semantic classifications. The seed image is compared to a collection of images using the distance measure. A set of similar images is determined from comparing the seed image to the collection of images.

20 Claims, 7 Drawing Sheets

PERFORMING IMAGE SIMILARITY OPERATIONS USING SEMANTIC CLASSIFICATION

CROSS REFERENCE TO RELATED APPLICATION

This application is a continuation of U.S. application Ser. No. 13/732,813, filed Jan. 2, 2013, the contents of which is incorporated by reference.

BACKGROUND

Examples described herein relate to a system and method for performing image similarity operations using semantic classification. Search systems currently exist for identifying images and image content in response to user queries. In particular, image search systems exist for responding to text-based queries, as well as to image-based queries. Image-based queries can process image data, such as a Joint Photographic Expert Group ("JPEG") file, as input. The search result for such image-based queries can include images or image content that are deemed similar in visual appearance to the query image.

Search systems that perform image similarity have applications for image search and retrieval. Under many conventional approaches, image similarity operations use histograms of color and/or texture, and then combine the histograms with weights that are learned through training.

SUMMARY

According to aspects described herein, image similarity operations are performed in which a seed image is analyzed, and a set of semantic classifications are determined from analyzing the seed image. The set of semantic classifications can include multiple positive semantic classifications. A distance measure is determined that is specific to the set of semantic classifications. The seed image is compared to a collection of images using the distance measure. A set of similar images is determined from comparing the seed image to the collection of images.

In one aspect, a quantitative representation for the seed image is determined. The quantitative representation of the seed image is compared to quantitative representations of images in the collection using the distance measure.

According to another aspect, the distance measure is determined from determining a distance function for each semantic classification of the set of semantic classifications. The distance measure is based on one or more of the distance functions.

According to another aspect, a confidence value can be determined for each distance function. The distance measure can be selected based on the distance function(s) with the highest confidence value.

According to another aspect, a distance function can be determined for each semantic classification in the set of semantic classification. The distance functions can be combined in order to determine the distance measure.

According to another aspect, the distance measure is based on a hierarchy of semantic classifications.

According to another aspect, only image data of the seed image is analyzed in order to determine the multiple semantic classifications.

According to another aspect, the set of similar images is determined in response to a search query that specifies the seed image as input.

According to another aspect, a low dimensional representation of the seed image is used to determine the set of semantic classifications, while the set of similar images can be determined using a high dimensional representation of the seed image.

In one implementation, a hierarchy of classification labels can be defined. The hierarchy of classification labels includes a root node having a first set of classification labels, multiple branch nodes from the root node in which each branch node includes a corresponding second set of classification labels, and multiple leaf nodes for each branch node. Each of the multiple leaf nodes may be associated with a set of images and a corresponding third set of classification labels. A representation of the seed image may be compared to the image associated with each of the multiple leaf nodes in order to determine the set of semantic classifications.

According to one aspect, a determination is made as to which images associated with each of the multiple leaf nodes satisfies a criterion for being a match. The seed image is assigned to each classification label that is in a branch extending from the matching leaf node to the root node.

DETAILED DESCRIPTION

Figure 1:
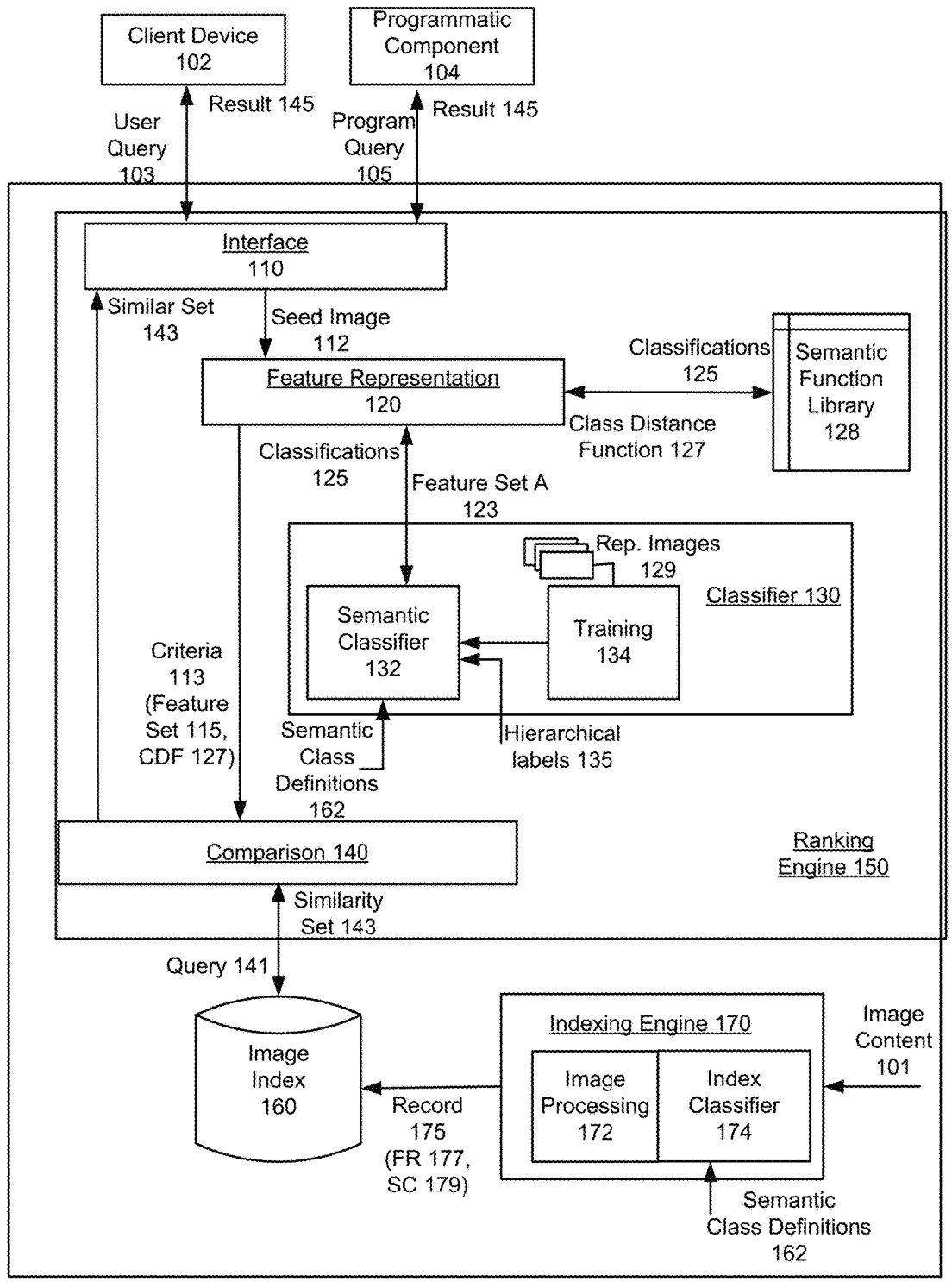
FIG. 1 illustrates a search system performing image similarity operations, according to an aspect.

FIG. 1 illustrates a search system for performing image similarity operations, according to an aspect. A search system 100 such as described by FIG. 1 can be implemented for a variety of applications, including image and video searching. The search system 100 can be implemented on a computer, or a combination of computers that communicate, for example, through a network. The search system 100 can receive queries 103 from end user devices, represented in FIG. 1 by client device 102. The client devices 102 can include, for example, a desktop computer, a portable computing device such as a laptop or tablet, or a mobile computing device.

Each client device 102 can be operated to submit a query to the search system 100. Each query 103 can correspond to a request for information. In some implementations, each query 103 specifies an image as input. For example, each query 103 can include image data, or include data that specifies an image file or content. In some implementations, the query 103 can be accompanied by other forms of input, such as text input or audio input. In one example, the search system 100 and the client device 102 can communicate though a network, or a combination of networks, such as through an intranet and/or the Internet. While the search system 100 and the client device 102 are shown to be on separate devices, in some variations the search system 100 and the client device 102 can be on a same device.

In one implementation, system 100 includes a ranking engine 150, an image index 160, and an indexing engine 170. The indexing engine 170 maintains the image index 160 for use by the search system 100. In examples described herein, the indexing engine 170 can process, for example, image content, and documents or resources that contain image content, in order to create and update records that reference images or documents that contain images. The indexing engine 170 can implement crawlers, spiders or other programmatic mechanisms to retrieve documents and content resources over the Internet. The documents and content resources can be parsed to identify, for example, image or video files.

The image index 160 stores index information provided from the indexing engine 170. The index information can include records 174, representing entries of, for example, image files, video files, and documents or content resources that include or provide image or video files. In one implementation, the image index 160 can store location information and identifiers for the images, in association with quantitative representations of the individual images and classifications determined for the images. The image index 160 can also store copies of the stored images, such as a thumbnail or reduced copy of the original image. Still further, the image index 160 can store information such as metadata or text that is provided with the individual image.

According to some implementations, the ranking engine 150 can include an interface 110, a feature extraction component 120, a classifier 130, and a comparison component 140. In one aspect, the interface 110 receives the user query 103 from the client device 102. The user query 103 can include an image file that the user uploads. Alternatively, the user query 103 can specify an image. As an example, an image for the user query 103 can be selected or specified by the user operating a browser or image/video rendering application on the client device 102. As another example, the user query 103 can correspond to video input selected by the user operating a video rendering or editing application on the client device 102. In some aspects, the query 103 includes only the image, without metadata or contextual information relating to the subject of the image specified by the query 103.

As an alternative or addition, the interface 110 is able to receive programmatic queries 105 from a programmatic component 104. The programmatic component 104 can correspond to a program that operates to select images and image content for search and/or retrieval operations. For example, programmatic component 104 can correspond to a script or process that executes to parse web pages and resources in identifying image or video content.

The interface 110 is configured to process queries 103, 105 to determine a seed image 112. The seed image 112 can correspond to, for example, an image file that is included in the query 103, 105, or an image file that is specified by location in the query 103, 105. If the query 103, 105 specifies the seed image, the interface 110 can retrieve the image based on the data included in the respective query.

In some variations, metadata and contextual information can be used in processing the search query 103, 105. For example, the interface 110 can include functionality for parsing or extracting text, metadata, and other information provided with the seed image 112. Additionally, the interface 110 can operate to extract metadata such as tags provided with the user query 103. In variations, the interface 110 can extract text and other information or data from a web page, in connection with locating an embedded image for use in performing image similarity operations. As another addition or variation, the interface 110 can determine contextual information with the respective search query 103, 105. As described below, some variations provide for use of text, metadata, content and/or other contextual information in order to determine semantic classifications for the seed image 112.

The feature representation component 120 can operate to determine one or more feature sets for the seed image 112. Each feature set can correspond to a quantitative representation of the seed image, such as a matrix representation of visual features that include one or more of color, texture, pattern, or shape. In one aspect, the feature representation component 120 determines a first feature set 123 for the seed image 112 for purpose of classification. The classifier 130 is able to determine one or more semantic classifications for the seed image 112 based on the first feature set 123. The first feature set 123 can represent the image with relatively low granularity or dimensionality. For example, the first feature set 123 can represent the image in the form of a color histogram.

In one aspect, the classifier 130 is able to use only image data from the seed image 112 to determine a set of positive semantic classifications for the input image. The positive semantic classification denotes the semantic meaning that is applicable to the seed image 112, as compared to a negative semantic classification which denotes what semantic meaning is not applicable to the seed image 112. In one implementation, the classifier 130 can determine one or more positive semantic classifications for the seed image 112 based on the first feature set 123. Thus, in contrast to many conventional approaches, the classifier 130 is able to determine the semantic classification using the image data of the seed image 112, and without requirement for metadata or contextual information that may not necessarily be accompanied with the query 103 of the seed image 112.

In one implementation, the classifier 130 includes multiple trained semantic classifiers 132, or processes thereof, that determine semantic classifications for newly received images based on a predefined semantic class definition 162. The class definition 162 includes data sets that are representative of pre-determined classifications of images. Each data set can include, for example, a matrix representation of an image or set of images that is deemed to be representative of the corresponding classification. According to some aspects, hundreds, thousands or hundreds of thousands of semantic classifications and categories can be included in the semantic class definition 162. Depending on implementation, the semantic classifier 132 determines a set of semantic classifications 125 for seed image 112. In some aspects, the classifications can include both positive labels that specify a class that is relevant to the seed image 112, and negative labels that specify a class that is not relevant to the seed image 112. Additionally, multiple relevant classifications can be assigned to the seed image 112. In examples, two or more semantic classifications or categories can be positively assigned for the given seed image 112. In some examples, several (e.g., ten or more) semantic categories designations may be assigned to the seed image 112. Thus, the set of semantic classifications 125 can include multiple positive semantic classifications. The ability of the semantic classifier 132 to determine positive semantic classifications for newly received images can be enhanced based on the number of representative image that are associated with each classification.

The classifier 130 can also include a training component 134 that trains the semantic classifier 132. In particular, the semantic classifier 132 includes one or more classification processes that can be trained to classify newly received images. The training component 134 can implement, for example, a process such as described with FIG. 3A in order to train the semantic classifier 132. In training the semantic classifier, the training component 134 can use sets of representative images 129 that are pre-classified or labeled so as to be associated with a particular semantic classification.

The semantic classifier 132 can assign multiple positive semantic classifications to a particular seed image 112. In one implementation, the semantic classifications can be based on image comparison as between the newly received image, such as the seed image 112, and the representative images 129 for the various categories that comprise the semantic class definition 162.

According to some aspects, a semantic function library 128 stores distance functions for each semantic classification of the semantic class definition 162. For each seed image 112, the determined classifications 125 can be used to identify corresponding distance functions. In one aspect, feature representation component 120 uses the determined classifications 125 to retrieve corresponding class distance functions 127 from a semantic function library 128. The feature representation component 120 can determine a quantitative representation of the seed image 112 that is based on a second feature set 115 and the class distance functions 127 of the determined semantic classifications. For example, a distance measure 129 can be determined from, for example, a summation, average, weighted average or other combination of the collective set of distance functions 127. Additionally, the second feature set 115 can identify multiple dimensions of the seed image 112, such as color, texture, pattern, shape and/or other feature characteristics. Thus, one aspect provides that the second feature set 115 incorporates a greater number of dimensions as compared to the first feature set 123 that is used for determining the semantic classification. The quantitative representation of the seed image 112 can provide, or be used as, a comparison criterion 113 for performing similarity operations using the records for the image library stored with the image index 160. The comparison criteria 113 can be based on a semantic-specific measure that is applied to the quantitative representation of the seed image 112. As described by various examples, the search system 100 recognizes that greater similarity can be determined amongst images when the distance measure 129 that is applied to computing similarity accounts for semantic classifications of the seed image 112.

The comparison component 140 uses the criteria 113 to determine a set of similar images from the image index 160. As described below, the image index 160 may be structured to include various types of information about image content, including feature representations of the image content, and semantic classifications or categorizations made of the identified image content.

According to some aspects, the indexing engine 170 includes crawlers, spiders or other functionality to crawl web pages and resources to detect and analyze image content 101. The indexing engine 170 can also include functionality that analyzes image content 101 from other sources in order to index individual images to include properties that include semantic classification and feature representation of images. Individual images may also be associated with network locations where the full rendition can be found. The indexing engine 170 may also generate a copy or duplicate of the original image to render in connection with a search result. For example, the indexing engine 170 may generate a thumbnail version of an image, and create an index record for the image that includes one or more semantic classifications or category designations for the image, as well as its feature set representation of the image. In this way, system 100 is able to return a search result that includes, for example, a thumbnail or reduced version of the image identified by the indexing engine 170.

According to some aspects, the indexing engine 170 includes an image processing component 172 and an index classifier 174. The indexing engine 170 may store a record 175 for each individual image. The record can specify a feature representation 177 of the image, as determined by the image processing component 172. The feature representation 177 can include a quantitative representation of a corresponding image. For example, the feature representation 177 can correspond to vector representation of a corresponding image. Additionally, the record 175 can specify one or more classifications 179 for the image, based on an output of the index classifier 174.

In more detail, some aspects provide that image processing component 172 can operate to process image content 101, including to determine feature sets for images, extract metadata and tags, and extract or process text or contextual information with the individual images. As an example, image processing component 172 can parse web pages and identify embedded images or image content, and extract metadata from the embedded images. In one implementation, the image processing component 172 can also perform image analysis on image content that is extracted from web pages during a web crawling process. For example, the image processing component 172 can determine quantitative representations of images that include color, texture, pattern and/or shape. For example, the image processing component 172 can determine shape or feature vectors, as well as color and texture histograms, for images it identifies and indexes. In this way, the image index 160 can be used to store quantitative representations of images that it indexes.

In some implementations, the indexing engine 170 partitions its record of images into semantic classifications, based on the semantic class definition 162. In one implementation, the index classifier 174 can determine classifications for the image content 101 based on the semantic class definition 162 or on an alternative semantic class definition. In implementation, the classification technique employed by the index classifier 174 on at least some images indexed by the indexing engine 170 can utilize labels or other metadata that is pre-associated with images, while such metadata may be unavailable when the seed image 112 is analyzed by the ranking engine 150. In one implementation, metadata or tags that are included with individual images are extracted by the indexing engine 170 and used to classify the image. As an addition or variation, text associated with individual images are extracted and processed by a text analysis component of the index 170 to determine whether a semantic classifier is applicable to the associated image content. Still further, the individual images can be analyzed for shape, color or other features in order to categorize the image. As still another addition or variation, the index classifier 174 can process selections made in connection with search queries for image content, while maintaining anonymity of the user base. The processed selections can include selections and/or co-selections. The information determined from such selections can associate specific images with search queries. The search queries can be referenced to semantic class definitions 162, in order to pair images with classification labels. As an addition or alternative, the index classifier 174 can operate as the classifier 130 of the ranking engine 150. For example, the index classifier 174 may also determine one or more semantic classifications from a possible list of hundreds or more classifications, without need for labels, text, metadata or other contextual information.

In one implementation, the indexing engine 170 can apply classification-specific distance measures to the quantitative representations of the images that are classified for purpose of enhancing the similarity matching that can be performed using the image index 160. For example, if multiple semantic classifications are deemed applicable to an image of record 175, a distance measure can be determined as a sum, average weighted sum/average or other combination of distance functions from each of the semantic classifications in order to determine the distance measure, and the distance measure can then be associated with the quantitative representation when the record is stored in the image index 160.

In one aspect, the comparison component 140 of the ranking engine 150 can include a process that queries 141 the image index 160 based on its criteria 113. The criteria 113 may include the feature set 115 and the determined distance measure 129 for the seed image 112, which can be based on the distance functions 127 for each semantic class that is determined for the seed image 112. The comparison component 140 uses the search criteria 113 to identify a similar set of image items 143 from the image index 160. The distance measure 129 is specific to the semantic classifications of the seed image 112. For example, the distance measure 129 can be based on the distance functions 127 of each determined semantic classification for the seed image 112. The use of distance measure 129 enables similarity searching using features and characteristics of images that are relevant to the semantic classifications of the seed image 112. As a result, the similar set 143 includes images that are more likely to be visually similar to the seed image 112, and the extent of the similarity for the individual items of the similar set 143 may be greater and/or more relevant as compared to more conventional approaches which do not account for semantic classification when determining distance measures.

The similar set 143 can correspond to images or documents that contain images. In some implementations, the items of the similar set 143 can be ranked or filtered by the ranking engine 150. Additionally, the ranking engine 150 may calculate scores for the items of the similar set 143 using one or more ranking signals. For image processing, the ranking signals can be based in part or entirely on a measure of similarity between individual items in the similarity set and the seed image 112 of the query 103, 105. For example, the items with more similar image content can be ranked higher or deemed to be more similar. Numerous other signals can also be used in order to rank the items of the similar set 143. For example, the ranking signals can include a parameter that is based on the overall quality of the source for individual items in the similar set 143. As another example, ranking signals can also include, for example, a recency of when the item was updated or created, or a popularity of a source of the item, such as the web page on which the image content was provided. The ranking engine 150 can rank the items of the similar set 143 based on an overall score that accounts for the various ranking signals, including the overall similarity score. In an implementation such as shown by FIG. 1, the similar set 143 is returned to client device 102 or programmatic component 104 as a result 145, 147. The results 145, 147 can include image files or documents containing image content which are responsive to the query 103. For example, a result 145 can include a title of a document or image file that is provided as part of the similar set 143, a link to a document or image file, a summary and/or a thumbnail of the image file or content. The result 145 can include multiple entries, representing different items of the similar set 143.

In an implementation in which the system 100 responds to query 105 generated from the programmatic component, the result 147 can include, for example, links to enable the programmatic component 105 to render one or more images from the similar set 143. Likewise, the result 147 can include other information, such as a title for the document or image file that is provided as part of the similar set 143.

In an aspect, similarity operations can be used to determine similar images from other classifications that are deemed similar to the semantic classification of the seed image 112. For example, as described with FIG. 3A, the classifier 130 can operate to determine a similar set of images for the seed image 112 having the same semantic classification of the seed image 112, as well as similar sets of images from other semantic classifications which are deemed similar to any one of the determined semantic classifications of the seed image 112.

Example User Interface

Figure 2:
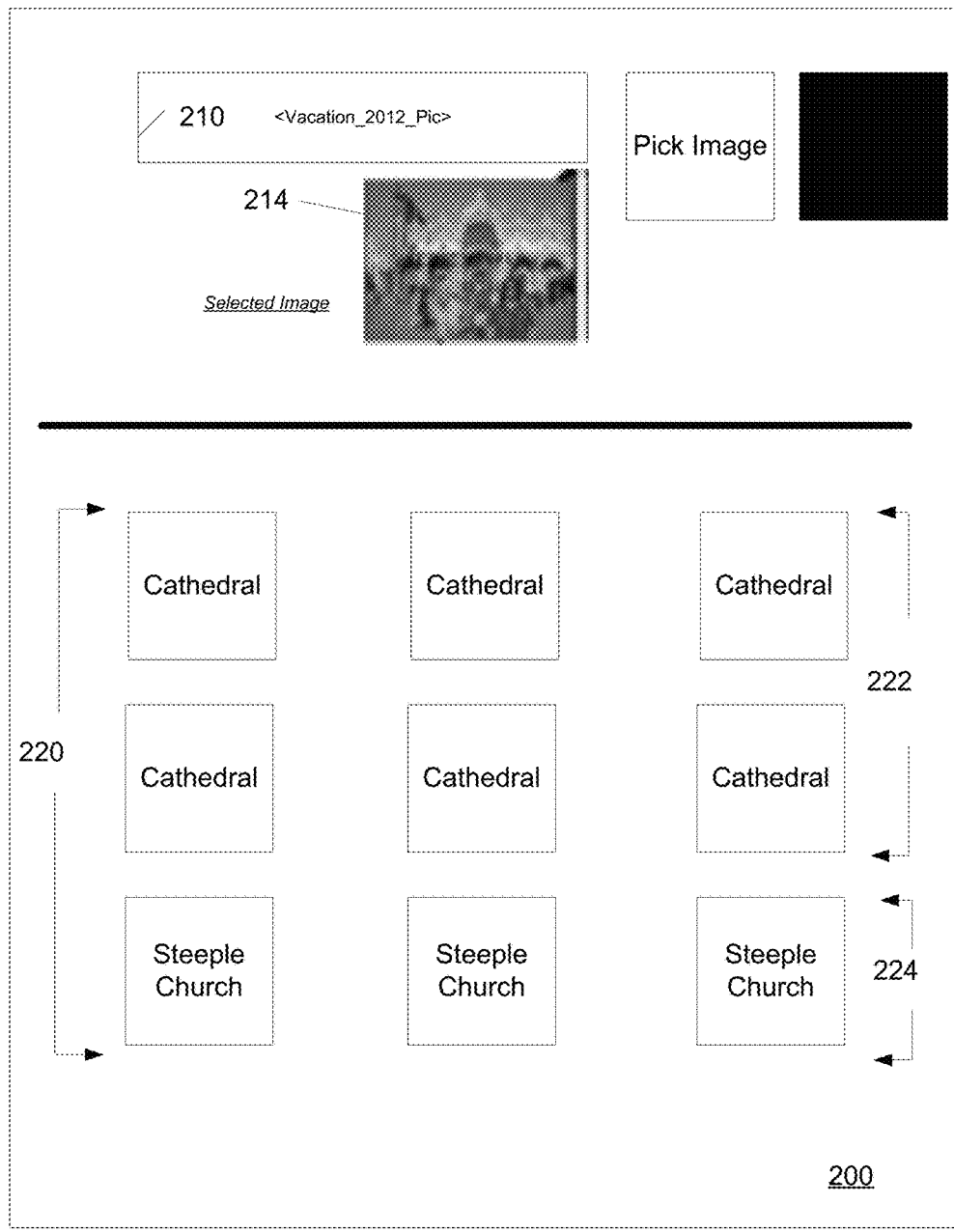
FIG. 2 illustrates an example search user interface, according to an aspect.

FIG. 2 illustrates an example search user interface, according to one aspect. The example search user interface can be provided as part of search system 100 (see FIG. 1). For example, an example search user interface of FIG. 2 can be provided by the interface 110. In the example of FIG. 2, an interface 200 includes input features 210 for enabling the user to generate a query that specifies an input image. For example, the features 210 may enable the user to upload an input image from the user's own computer. As another example, the features 210 may enable the user to specify an input image from an online account or resource. In the example provided, input image 214 depicts a group of individuals standing in front of the cathedral. In one implementation, while interface 200 enables the user to specify the image for a query, no labels, text, or contextual information is provided with the image. For example, the user may simply select or upload the image for the search query.

Figure 4A:
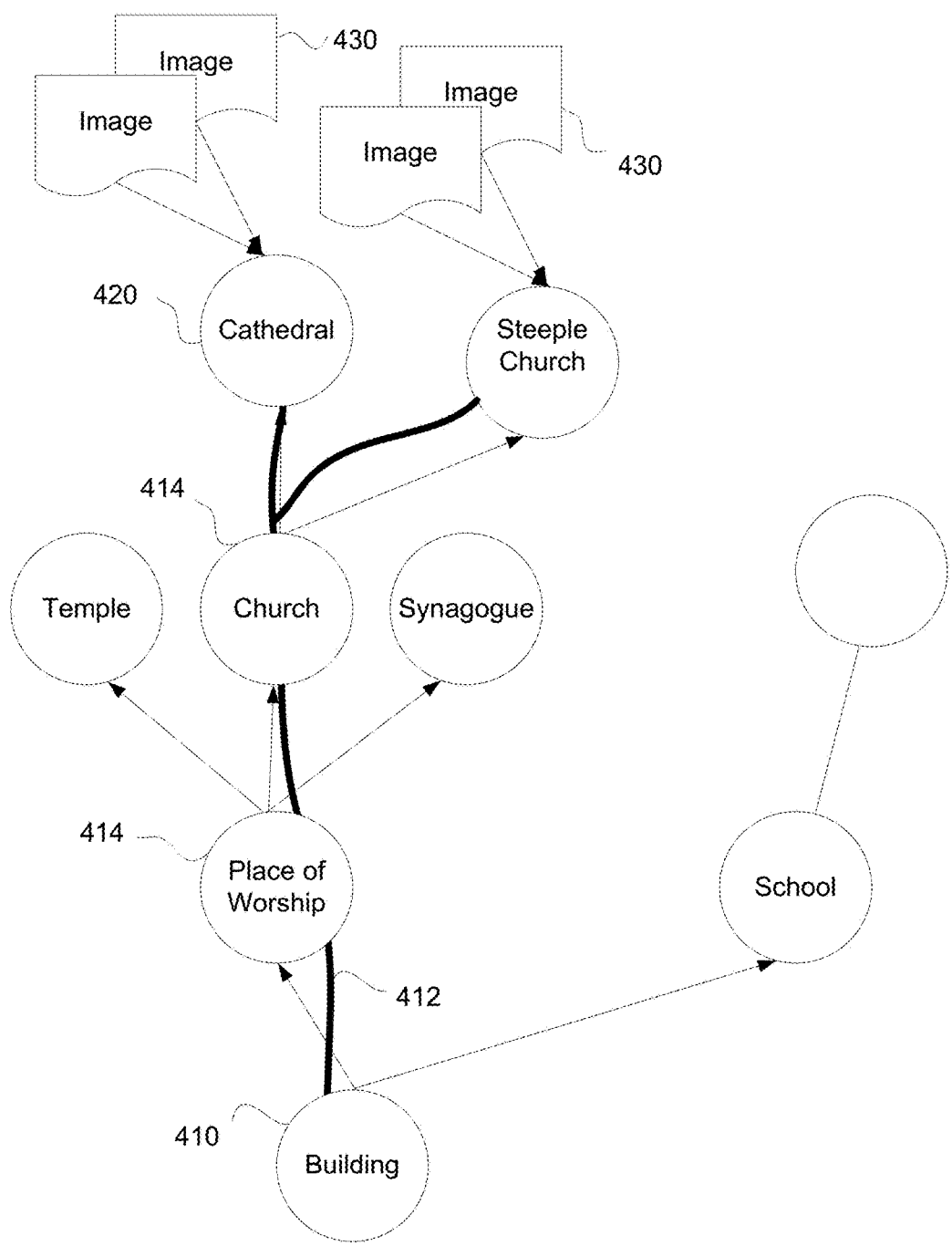
FIG. 4A illustrates an example of a definition of a classification hierarchy.
Figure 4B:
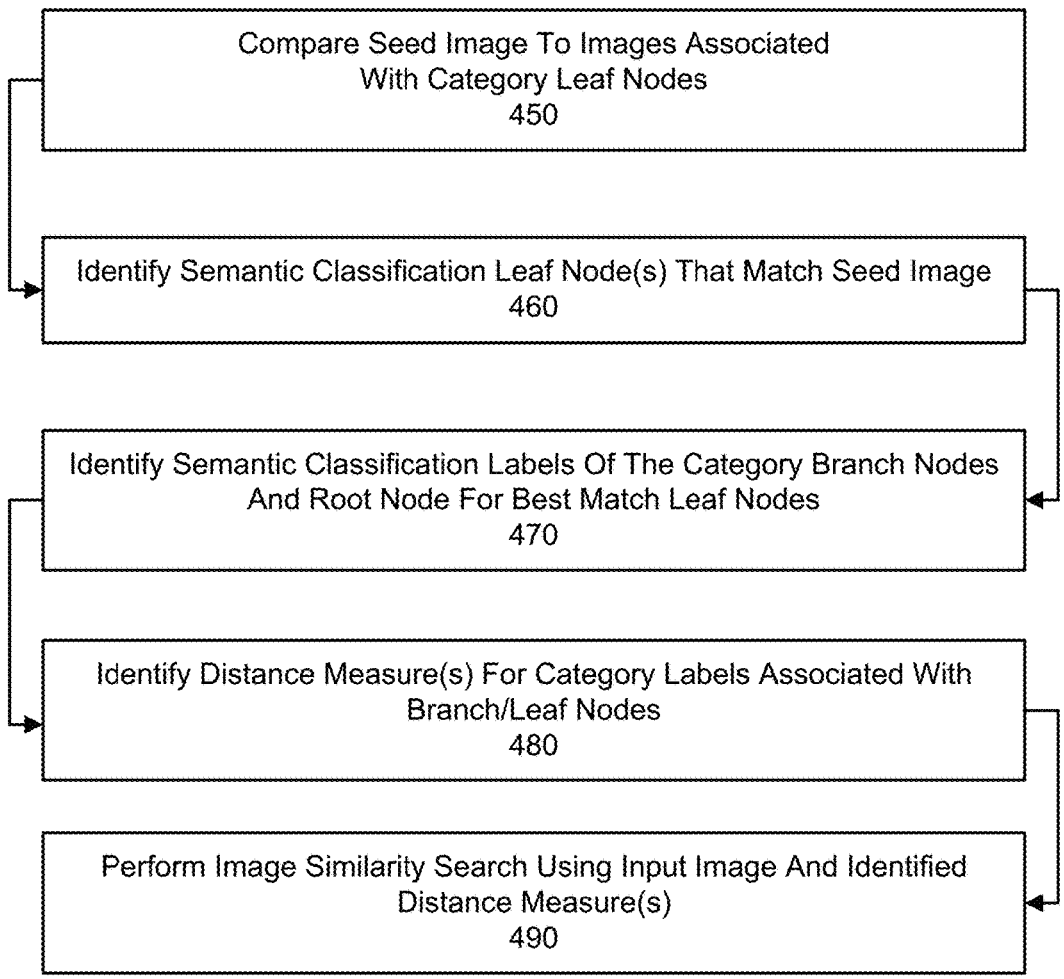
FIG. 4B illustrates a method for using a semantic classification hierarchy, such as illustrated by FIG. 4A, for determining a distance measure for a seed image.

In response to the user search query, the search system 100 generates a search result 220 that takes into account multiple semantic classifications that are determined for the input image 214. The semantic classifications of the input image 214 may be based on the image data itself. For example, image processing steps may recognize a building in the background of the image. In some implementations such as shown by FIG. 4A and FIG. 4B, the semantic classifications are structured into a defined hierarchy of classification labels. As applied to the example of FIG. 2, the most generic semantic classification would be that the image relates to a building, then to place of worship, then to church, and most specifically to a cathedral. A distance measure may be determined based on the semantic classifications determined for the input image 214. The distance measure may be applied to a quantitative representation of the input image 214 in determining the result 220. As illustration, the search result 220 includes a set of images 222 that are deemed to depict cathedrals based on the determined semantic classification of the image. In addition, another set 224 of images in the search result 220 include images of church steeples, which can share some of the semantic classifications for cathedral; e.g., building, place of worship and church. In one implementation, the search result 220 includes user selectable images that are versions, e.g., thumbnails, of images that were crawled and indexed. The selection of the image as provided in the search result 220 may navigate the user to a landing page where the crawled image resides. For example, the user can select a thumbnail to view a larger image of the selected thumbnail on a landing page.

In one implementation, the distance measures for the cathedral and the steeple church may include distance functions for classifications for buildings, places of worship and churches, but the two distance measures may differ in that the two structures are recognized as being of different classifications of churches. Visually, the distance between the cathedral and steeple church may be nearest. In this way, the use of distance measures that are specific to the semantic classifications of the input image can inherently generate visual comparisons to other images that have the same set of semantic classifications, as well as those images which have semantic classifications that are similar or nearest to the classifications of the input image.

Other implementations can implement comparison operations and search results in different manners. In one example of FIG. 2, the ranking of the search result 220 lists those images of the same set of semantic classifications, followed by those images that are nearest or most similar in semantic classification. In another implementation, the distance measure determined from the input image 214 can be weighted or otherwise combined to yield at least some results that are deemed to be visually similar, and the results may be ranked based on similarity, without regard for which of the semantic classifications are matched.

Methodology

Figure 3A:
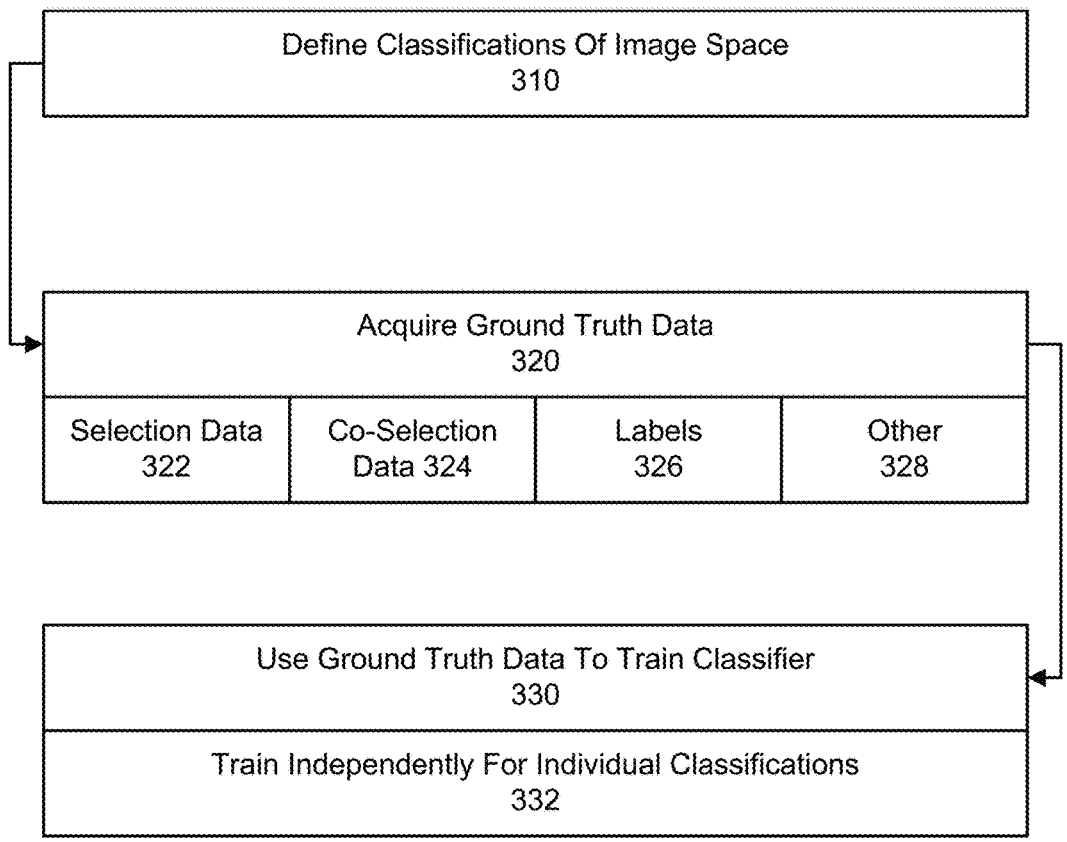
FIG. 3A illustrates an example method for training a semantic classifier.

FIG. 3A illustrates an example method for training a semantic classifier. An example such as described with FIG. 3A can be implemented by a training component, such as described with an example of FIG. 1. Examples such as described by FIG. 3A and FIG. 3B can be implemented using a search system such as described by an example of FIG. 1. Accordingly, reference may be made to elements described with FIG. 1 for purpose of illustrating suitable components for performing a step or sub step being described with either FIG. 3A or FIG. 3B.

With reference to FIG. 3A, the semantic class definition is determined (310). The semantic class definition 162 can include the classifications of the image space, as well as the relationship amongst individual classifications. In one implementation, such as described with FIG. 4A, a hierarchical arrangement can be used to define relationships amongst determined classifications. Each semantic classification can be associated with a set of images, and/or matrix values for images that are deemed to represent that semantic classification. Numerous semantic classifications can be identified for the semantic class definition 162. For example, thousands or hundreds of thousands of classifications may be identified as part of the semantic class definition 162.

Training data relating to the semantic classifications of the image space is obtained (320). The training data can identify or include a representative set of images, or a quantitative set of image representations, for individual classifications identified in the semantic class definition. For example, in one implementation, the training data can include selection data (322). The selection data can correspond to historical information that references images returned in search results with interaction activity of users that received the respective search results. The search queries that provide the training data can be text-based, so that the search queries can be correlated to classification labels or entries of the semantic class definition 162. The training component 134 can use information determined from search queries to identify a set of representative images for a particular classification identified in the semantic class definition 162.

As an addition or alternative, the training data can include co-selection data (324). Co-selection data includes historical information that references images that were co-selected with one another in response to a search result. For example, the co-selection of multiple images in response to a search query can identify images that are representative of the search query, as well as images that are relevant or similar to one another by way of having been co-selected for a common search query.

As another addition or alternative, the training data for individual semantic classifications can include negative examples (326). In particular, images that were not selected in response to search queries can provide negative training examples for use in determining semantic classifications.

Other sources for training data can also be used (328). For example, manual sources, such as crowd-sourcing can be utilized to generate training data, such as identification of representative images for individual classifications in of the semantic library 162.

The training data can be accumulated and used to train a classifier for determining semantic classifications (330). According to one aspect, the training data can be used to determine distance functions associated with individual semantic classifications. According to another aspect, the training data can also be used to determine, for example, the weights used in respective distance functions for purpose of determining the individual semantic classifications.

In one implementation, the semantic classifier 132, or set of classifiers, is independently trained for determining each semantic classification of the image space (332). Thus, a separate set of training data and process can be used to train the semantic classifier(s) 132 for individual classifications of the semantic library 162. Various machine learning algorithms can be used to train the classifier(s) 132. For example, machine learning algorithms such as Adaptive Boosting or Support Vector Networks (SVM) techniques can be employed to train the semantic classifiers 132 as to individual classifications of the semantic library 162.

According to one aspect, the semantic classifier(s) 132 can be continuously trained over time with, for example, with responses or feedback by users to determinations made by the semantic classifier 132. In this way, the semantic classifier(s) 132 can be improved upon with the accumulation of data over time.

According to some aspects, the classifier 132 can also be trained to determine similarities amongst images that are associated with different classifications. The training data can include, for example, matrix representations of images, as well as information to identify the semantic classification of the images of the training data. The training process can then be implemented to determine which classifications are similar to one another. In turn, similarity operations can be performed for a seed image that identifies similar images of a same semantic classification or classifications, as well as similar images from other classifications that are deemed similar to the classification of the seed image.

Still further, in one implementation, a visual kernel function $K(x,y)$ can be used to represent visual characteristics for images of the training data, and a classification kernel $L(x,y)$ can be used to characterize the similarities amongst classifications. The combined kernel function $K(x,y)L(x,y)$ can be used to train the classifier 132 in determining distance measures amongst the same classifications and amongst classifications that are deemed to be similar.

Figure 3B:
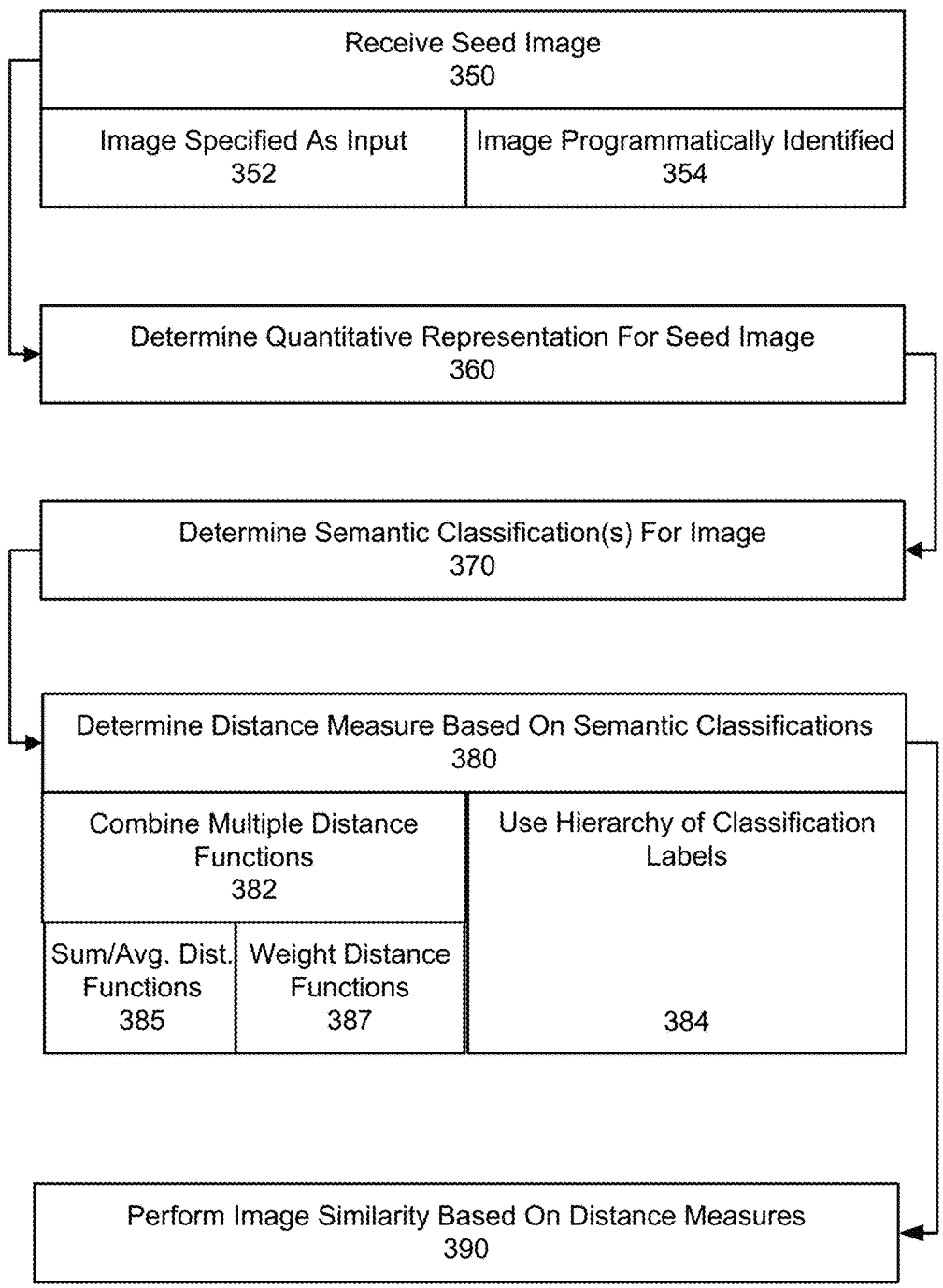
FIG. 3B illustrates an example method for performing an image similarity search on an input image.

With reference to FIG. 3B, a seed image is received by the search system (350). The seed image can correspond to, for example, an input image that is included or specified in a query (352). Alternatively, the seed image can be programmatically identified and/or retrieved (354). According to one aspect, the seed image is received without metadata or other contextual information. The seed image can be assigned to multiple positive semantic classifications, selected from a set that can include hundreds or thousands of classifications.

The seed image can be analyzed in order to determine a quantitative representation for the seed image (360). For example, a feature vector, shape vector, color histogram, and/or textual histogram can be determined for the seed image.

The image specified in the query may be semantically classified (370). The semantic classification for the input image can be determined in part from the quantitative representation of the seed image. Multiple semantic classifications can be determined for the input image. Furthermore, the number of semantic classifications that can be determined may vary for each input image. According to some implementations, the classifier 130 can be configured to determine multiple semantic classifications that are likely applicable to the seed image 112, based on a semantic category definition that includes hundreds or thousands of semantic classifications. In some implementations, the classifier 130 can be implemented as multiple processes that individually classify the input image as belonging to, or not belonging to a specific classification.

Still further, according to one aspect, the classifier 130 is able to determine one or more semantic classifications for the input image without use of metadata or contextual information that would otherwise be provided with the seed input. For example, the image portion or designation of the query 103 can be provided with no text or metadata, requiring the classifier 130 to determine the semantic classification using only the image data.

A distance measure is determined for the seed image that is specific to the semantic classifications that are determined for the seed image (380). In one implementation, each semantic classification can be associated with a distance function. A distance function is retrieved for each semantic classification of the seed image 112. The distance function is representative of features that are most relevant to the corresponding classification. For example, each semantic classification in the semantic classification dictionary 162 can be associated with a distance function that is specific to that classification. In one implementation, the classifier retrieves each applicable distance function upon determining the classifications for the seed image 112.

In one implementation, the distance function for each determined semantic classification can be combined in order to determine the distance measure for the set of semantic classifications (382). For example, the distance functions can be provided as vectors or matrices that are summed or averaged (385). As a variation, the distance function can be weighted and then combined (387). In variations, the distance functions can be combined in other ways.

In one implementation, the determined weight for the distance function of each semantic classification can affect the influence of that particular semantic classification relative to other semantic classifications determined for the same image. As an example, the weighting of the individual distance functions that are determined for the seed image can be based on a confidence value associated with the determination of those semantic classifications. For example, color and/or texture can be compared amongst the input image and the sample images for the semantic classification in order to determine the degree of similarity between the seed image and the sample images. A threshold may be defined to determine when the comparison between the input image and the sample image of a semantic classification is sufficiently similar to deem the input image as being of the same category. The confidence value associated with a determination of a particular semantic classification can be based on the degree of similarity between the seed image and the representative images of that classification. For example, the confidence value can be based on the degree of similarity between a low dimensional representation of the seed image, e.g., color histogram, and one or more representative images of the particular semantic classification. Thus, the weights assigned to each distance function may reflect a degree of similarity between the seed image and the representative images of the particular semantic classification for the distance function.

In one implementation, the weights can be determined from co-information that reflects co-selection activities associated with sample images of the individual classifications. For example, a triplet methodology may be used to determine the confidence value of a semantic classification for the seed image 112. Two or more images can be paired to the same semantic classification based on the co-selection data. If the input image is more similar in appearance to one of the images as compared to the other of the two or more images, then the confidence value for the semantic classification can be deemed high. Likewise, the input can be deemed sufficiently similar to two or more of the images for the semantic classification, but the similarity between the input image and the two other images may be quantitatively less than the similarity between the two sample images with respect to one another. In such case, the confidence value of the semantic classification may be relatively low.

As an addition or alternative, multiple distance functions can be determined for the seed image, and the distance measure can be based on a selection of the distance function that has, for example, the best visual match.

As another addition or alternative, a hierarchy of classification labels can be defined and used to assign multiple classification labels to the seed image (384). An example of a hierarchy of classification labels is described with an example of FIG. 4A, and its use in determining multiple semantic labels is described with an example of FIG. 4B.

Once the distance measures are determined for the seed image, an image similarity operation is performed using the seed image (390). According to aspects, the seed image can be compared against the images of the image index 160. The image similarity operations can utilize the quantitative representation of the seed image, as well as the distance measure that is based on the multiple semantic classifications of the seed image. In one implementation, the distance measure is applied to the quantitative representation of the seed image and then compared to the index of images to identify images that satisfy a similarity threshold, and/or which are deemed to be one of a set of most similar images, etc. By determining the semantic classifications of input image, the input image can be compared to other images based on features that are salient to the classifications of the input image. The results provide for images that are similar to the input image, based on the relevance of the compared features, as determined by the classifications of the input image and the indexed images.

Semantic Classification Label Hierarchy

In some implementations, the semantic classifications of the seed image can be determined from use of a defined semantic classification label hierarchy. FIG. 4A illustrates an example of a definition of a classification hierarchy. In FIG. 4A, a classification hierarchy can include one or more root nodes 410 that each correspond to a generic classification. The root node 410 stems to branches 412, and each branch 412 includes branch nodes 414. Additional branches may stem from each branch node. Additionally, each branch node includes multiple leaf nodes 420. Each leaf node 420 can be defined by a semantic label and a set of images. The branch nodes 414 and the root nodes 410 can also be defined by semantic labels.

In one implementation, a sequence of branch nodes that extends from each leaf node to the root node corresponds to a series of progressively more generic semantic classifications that are relevant to one another. Thus, each branch node can provide a species for a preceding node that is, or is closer to, the root node, and each branch node can provide a more generic category designation for another node that is, or is closer to, one of the leaf nodes. In this way, the semantic classification definition 162 can correspond to a hierarchy in which a multitude of semantic classifications are represented by leaf nodes.

In the example of FIG. 4A, the semantic classification label for the root node can correspond to a generic classification such as "Building," followed by the following semantic classification labels extending outward from the root node: "Building Of Worship," and "Church." In the example shown, the semantic classification label of the leaf nodes corresponds to "Cathedral" and "Steeple Church," both of which stem from the same set of branch nodes. In the classification hierarchy, the leaf nodes 420 are associated with representative images 430 of their respective semantic classification labels. The images 430 associated with the leaf nodes 420 can be determined from a variety of sources, such as through use of interaction data that reflects the selections or co-selections of users made in response to search queries of the particular semantic classification label.

FIG. 4B illustrates a method for using a semantic classification hierarchy, such as illustrated by FIG. 4A, for determining a distance measure for a seed image. A method such as described by FIG. 4B may be implemented using a system such as described by an example of FIG. 1. Accordingly, reference may be made to elements described in FIG. 1 for purpose of illustrating a suitable component for performing a step or sub step being described.

In an example of FIG. 4B, a seed image is compared to images associated with the leaf nodes of the classification hierarchy in order to determine which category leaf nodes are matches to the input image (450). In one implementation, a low dimensional quantitative representation of the seed image is compared to the associated images of each leaf node in the classification hierarchy. For example, a color and/or texture histogram for the seed image may be compared to similar dimensional representations of images associated with each of the respective leaf nodes. With reference to search system 100 of FIG. 1, the classifier 130 can include or integrate processes that perform image analysis to identify the best matching category leaf nodes. By limiting the comparison between the input image and the images of the leaf nodes in dimensionality or granularity, the classifier 130 is able to perform a multitude of comparisons against a relatively large number of images associated with leaf nodes in the classification hierarchy. A match may be deemed to exist between the input image and one or more leaf nodes if some or all of the images associated with the particular leaf node are similar based on a predetermined threshold or criterion for comparison. As an addition or alternative, a match may be deemed to exist between the input image and a set of one or more leaf nodes that are deemed to be the best match to the input image.

The semantic classification leaf nodes that matched the seed image are identified (460). The seed image may be deemed to match one or more of the leaf nodes if the seed image and at least one of the representative images of the leaf node are deemed to be sufficiently similar, so as to be within a pre-determined threshold for being considered matching. In variations, more than one leaf node may be deemed to match the seed image. Still further, in other variations, the matching leaf node is the leaf node that has the highest degree of similarity with the seed image. In such variations, only one leaf node may be deemed to match the seed image.

For each matching leaf node, the semantic classification labels of the preceding branch nodes and root that form the branch of the leaf node are identified and assigned to the seed image as semantic classification labels (470). With reference to FIG. 4A, for example, the leaf nodes of "cathedral" can include preceding branch nodes of "Church" and "Place of Worship," with the root node of "Building." Thus, the branch and root nodes may correspond to word labels. Thus, the image comparison for the leaf nodes can result in multiple word associations that are determined from the categorical hierarchy.

A distance measure can be determined based on the semantic classification labels determined for the seed image (480). In one aspect, a distance function can be identified for each classification that is associated with one of the root node, branch node and leaf node. The distance functions are then combined to provide the distance measure. Once the distance measure is determined, a similarity search is performed using the input image the identified distance measure (490).

Computer System

Examples described herein provide that methods, techniques and actions performed by a computing device are performed programmatically, or as a computer-implemented method. Programmatically means through the use of code, or computer-executable instructions. A programmatically performed step may or may not be automatic.

Examples described herein may be implemented using programmatic modules or components. A programmatic module or component may include a program, a subroutine, a portion of a program, or a software component or a hardware component capable of performing stated tasks or functions. As used herein, a module or component can exist on a hardware component independently of other modules or components. Alternatively, a module or component can be a shared element or process of other modules, programs or machines.

Furthermore, examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, examples may be implemented in the form of computer-programs, or a computer usable carrier medium capable of carrying such a program.

Figure 5:
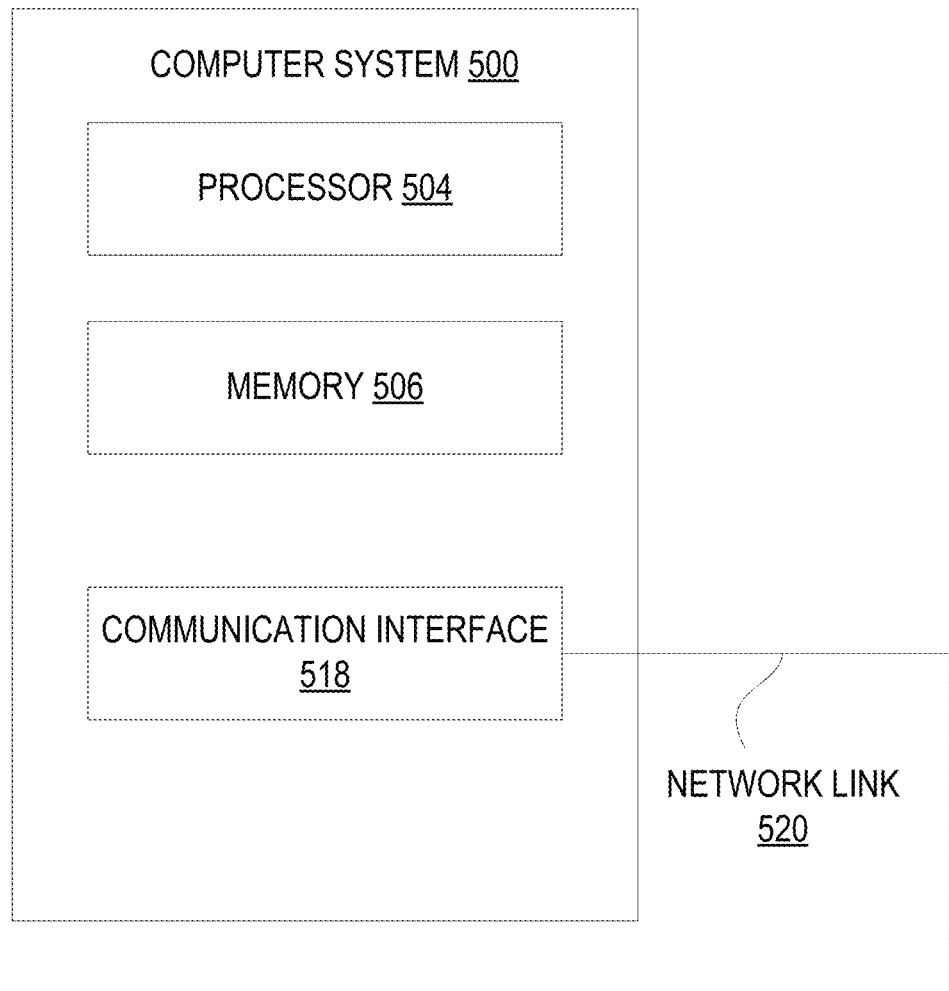
FIG. 5 is a block diagram that illustrates a computer system upon which examples described herein can be implemented.

FIG. 5 is a block diagram that illustrates a computer system upon which aspects described herein may be implemented. For example, in the context of FIG. 1, search system 100 may be implemented in part using a computer system such as described by FIG. 5.

In one implementation, computer system 500 includes processor 504, memory 506 (including non-transitory memory), and communication interface 518. Computer system 500 includes at least one processor 404 for processing information. Computer system 500 also includes a memory 506, such as a random access memory (RAM) or dynamic storage device, for storing information and instructions to be executed by processor 504. The memory 506 also may be used for storing temporary variables or other intermediate information during execution of instructions to be executed by processor 504. Computer system 500 may also include a read only memory (ROM) or other static storage device for storing static information and instructions for processor 504. The communication interface 518 may enable the computer system 500 to communicate with a network, or a combination of networks, through use of the network link 520 (wireless or wireline).

Examples described herein are related to the use of computer system 500 for implementing the techniques described herein. According to one aspect, those techniques are performed by computer system 500 in response to processor 504 executing one or more sequences of instructions contained in memory 506. Such instructions may be read into memory 506 from another machine-readable medium, such as storage device 510. Execution of the sequences of instructions contained in memory 506 causes processor 504 to perform the process steps described herein. In alternative implementations, hard-wired circuitry may be used in place of or in combination with software instructions to implement examples such as described herein. Thus, examples as described are not limited to any specific combination of hardware circuitry and software.

Although illustrative examples have been described in detail herein with reference to the accompanying drawings, variations to specific aspects and details are encompassed by this disclosure. It is intended that the scope described herein can be defined by claims and their equivalents. Furthermore, it is contemplated that a particular feature described, either individually or as part of an example, can be combined with other individually described features, or parts of other examples. Thus, absence of describing combinations should not preclude the rights to such combinations.

What is claimed is:

1. A method implemented by one or more processors, the method comprising:
    receiving a query including information regarding a seed image;
    processing the query to identify the seed image;
    analyzing the seed image to determine the quantitative representation of the seed image;
    determining a set of one or more semantic classifications from the quantitative representation of the seed image;
    determining a distance measure for the set of one or more semantic classifications;
    comparing the seed image to a collection of images using the distance measure;
    determining a set of similar images from comparing the seed image to the collection of images; and
    providing the set of similar images in response to the query.

2. The method of claim 1, wherein comparing the seed image to a collection of images using the distance measure comprises:
    comparing the quantitative representation of the seed image to quantitative representations of images in the collection using the distance measure.

3. The method of claim 1, wherein the quantitative representation of the seed image comprises a color histogram of the seed image.

4. The method of claim 1, wherein determining the distance measure for the set of one or more semantic classifications comprises:
    determining a distance function for each semantic classification of the set of semantic classifications; and
    determining the distance measure based on one or more of the distance functions for the semantic classifications of the set of semantic classifications.

5. The method of claim 1, wherein determining a distance function for the set of one or more semantic classifications comprises:
    determining a confidence value for each distance function, wherein the distance measure is selected based on the distance function with the highest confidence value.

6. The method of claim 1, wherein determining the distance measure for the set of one or more semantic classifications comprises:
    determining a distance function for each semantic classification in the set of semantic classification; and
    combining the distance functions in order to determine the distance measure.

7. The method of claim 6, wherein combining the distance functions comprises averaging the multiple distance functions.

8. The method of claim 1, wherein analyzing the seed image comprises analyzing only image data of the seed image in order to determine the set of semantic classifications.

9. The method of claim 1, wherein the seed image comprises an input image, and wherein determining a set of similar images is performed in response to a search query that specifies the input image.

10. The method of claim 1, wherein determining the distance measure is based on a hierarchy of semantic classifications.

11. The method of claim 1, further comprising:
    defining a hierarchy of classification labels, the hierarchy of classification labels including a root node having a first set of classification labels, multiple branch nodes from the root node, each branch node including a corresponding second set of classification labels, and multiple leaf nodes for each branch node,
    wherein each of the multiple leaf nodes is associated with a set of images and a corresponding third set of classification labels, and
    wherein determining the set of semantic classifications includes comparing a representation of the seed image to each image associated with each of the multiple leaf nodes for each of the multiple branch nodes.

12. The method of claim 11, wherein determining the set of semantic classifications comprises determining which images associated with each of the multiple leaf nodes for each of the multiple branch nodes satisfies a criterion for being a match, and then assigning the seed image to each classification label that is in a branch extending from the leaf node that includes the image that satisfies the criterion to the root node.

13. A system comprising:
one or more computers and one or more storage devices storing instructions that are operable, when executed by the one or more computers, to cause the one or more computers to perform operations comprising:
receiving a query including information regarding a seed image;
processing the query to identify the seed image;
analyzing the seed image to determine the quantitative representation of the seed image;
determining a set of one or more semantic classifications from the quantitative representation of the seed image;
determining a distance measure for the set of one or more semantic classifications;
comparing the seed image to a collection of images using the distance measure;
determining a set of similar images from comparing the seed image to the collection of images; and
providing the set of similar images in response to the query.

14. The system of claim 13, wherein comparing the seed image to a collection of images using the distance measure comprises:
comparing the quantitative representation of the seed image to quantitative representations of images in the collection using the distance measure.

15. The system of claim 13, wherein the quantitative representation of the seed image comprises a color histogram of the seed image.

16. The system of claim 13, wherein determining the distance measure for the set of one or more semantic classifications comprises:
determining a distance function for each semantic classification of the set of semantic classifications; and
determining the distance measure based on one or more of the distance functions for the semantic classifications of the set of semantic classifications.

17. The system of claim 13, wherein determining a distance function for the set of one or more semantic classifications comprises:
determining a confidence value for each distance function, wherein the distance measure is selected based on the distance function with the highest confidence value.

18. The system of claim 13, wherein determining the distance measure for the set of one or more semantic classifications comprises:
determining a distance function for each semantic classification in the set of semantic classification; and
combining the distance functions in order to determine the distance measure.

19. The system of claim 18, wherein combining the distance functions comprises averaging the multiple distance functions.

20. A non-transitory computer-readable medium storing software comprising instructions executable by one or more computers which, upon such execution, cause the one or more computers to perform operations comprising:
receiving a query including information regarding a seed image;
processing the query to identify the seed image;
analyzing the seed image to determine the quantitative representation of the seed image;
determining a set of one or more semantic classifications from the quantitative representation of the seed image;
determining a distance measure for the set of one or more semantic classifications;
comparing the seed image to a collection of images using the distance measure;
determining a set of similar images from comparing the seed image to the collection of images; and
providing the set of similar images in response to the query.

* * * * *